United States Patent [19]

Wrasidlo

[11] Patent Number: 4,774,039
[45] Date of Patent: Sep. 27, 1988

[54] DISPERSING CASTING OF INTEGRAL SKINNED HIGHLY ASYMMETRIC POLYMER MEMBRANES

[75] Inventor: Wolfgang J. Wrasidlo, La Jolla, Calif.

[73] Assignee: Brunswick Corporation, DeLand, Fla.

[21] Appl. No.: 932,372

[22] Filed: Nov. 19, 1986

Related U.S. Application Data

[60] Division of Ser. No. 291,927, Aug. 11, 1981, Pat. No. 4,629,563, Continuation-in-part of Ser. No. 103,566, Mar. 4, 1980, abandoned.

[51] Int. Cl.$^4$ .............................................. B29D 27/00
[52] U.S. Cl. .................... 264/41; 210/500.34; 210/500.38; 210/500.4; 210/500.43; 210/500.41
[58] Field of Search ................ 210/500.34, 500.38, 210/500.4, 500.41, 500.43, 490; 264/41

[56] References Cited

U.S. PATENT DOCUMENTS 3,615,024 10/1971 Michaels .
3,883,626 5/1975 Kamide et al. .
3,998,245 10/1976 Wang .
4,340,479 7/1982 Pall .

FOREIGN PATENT DOCUMENTS 2110158 11/1978 Fed. Rep. of Germany .
526978 10/1972 Switzerland .
1495887 12/1977 United Kingdom .

OTHER PUBLICATIONS

Kock, K., "Unter Suchungen uber den Bildungsmechanismus Asymmetricher Membranen fur die Umgekehrte Osmose" (1975).
Sartorius Laboratory Catalog, p. 91.
Amicon Catalog, Jan. 1977, p. 6.
Brock, Membrane Filtration, 1983 (sic.) p. 55.
ASTM F-316-70.
"Research and Development Progress Report No. 359", Oct. 1968, p. 37-43.
Marshall, J. C. et al., "Certain Porosity Aspects of Membrane Filters: Their Pore-Distribution and Anisotrophy", p. 214-219, 4-76.

Primary Examiner—Frank Spear
Attorney, Agent, or Firm—James S. Waldron

[57] ABSTRACT

There is disclosed, in one aspect, an improved highly asymmetric membrane comprising a skin and a porous asymmetric support. The skin contains pores which have an mean pore diameter of from about 0.005 to about 3.0 microns and the asymmetric support comprises a reticulated structure which contains pores which have pore diameters of from about 10 to about 20,000 times as large as the pore diameter of the pores of the skin. The membrane has a bulk porosity greater than about 70%. In another aspect, there is disclosed a process for preparing these membranes. This process comprises casting a polymer dope while the dope is in an unstable liquid dispersion condition. The concentration of polymer in the polymer dope should be high enough to produce a coherent membrane yet low enough to form a substantially all-reticulated structure within the asymmetric support. The membranes are characterized by high flow rates, excellent retention properties, and improved resistance to fouling.

11 Claims, 5 Drawing Sheets 25,000 MOL. WT. CUTOFF

TOP SURFACE
100,000 X

BOTTOM SURFACE
80 X

PORE ASYMMETRY 1:20,000

25,000 MOL. WT. CUTOFF

TOP SURFACE
100,000 X

BOTTOM SURFACE
20,000 X

PORE ASYMMETRY 1:1

DISPERSING CASTING OF INTEGRAL SKINNED HIGHLY ASYMMETRIC POLYMER MEMBRANES

CROSS REFERENCE TO RELATED APPLICATION

This application is a division of U.S. Ser. No. 291,927, filed 8-11-81, now U.S. Pat. No. 4,629,563, which is a continuation-in-part of U.S. Ser. No. 103,566, filed Mar. 4, 1980 now abandoned to Wrasidlo and entitled "Improved Anisotropic Membranes And Process Therefor".

BACKGROUND OF THE INVENTION

1. Field of Invention

This invention relates generally to membranes which are useful as ultrafilters and microporous membranes useful in separating materials. More particularly, this invention relates to improved integral asymmetric membranes having a skin and a porous support.

2. Description of the Prior Art

Polymeric membranes are well known. These membranes may generally be classified according to their retentivity, i.e., the sizes of particles which they retain, or according to their effective pore diameter, as either ultrafilter membranes, which have the finest pores, or microporous (or microfilter) membranes which have coarser pores. The dividing line between ultrafilter membranes and microfilter membranes is between approximately 0.025 and 0.050 micrometers in pore diameter or smallest retained particle.

Membranes may also be classified according to the porosity difference or similarity of their two faces. Thus, membranes may be classified as symmetrical, when the two faces have similar porosity or as asymmetrical when the two faces differ in porosity.

An important characteristic of a membrane is its permeability to water which is measured by the volume of pure water which passes through a unit area of membrane per unit time. Water permeability is customarily expressed in units of cm/min-psi which represents the macroscopic velocity in cm/min at which water flows through the membrane when the driving pressure is one psi.

The flow of water through the membrane is, within wide limits, directly proportional to the applied pressure. In general, the permeability to water decreases as the retentivity of the membrane to solutes increases, because smaller pores offer more resistance to flow. This relationship, however, is not a simple one since the retentivity depends on the single smallest pore encountered by the liquid in passing through the membrane, whereas the resistance to flow depends on the cumulative effect of all the pores through which this liquid must pass. Hence, membranes of similar solute retention having uniform pores throughout their entire thickness have lower permeability than those whose retentivity is due to a thin skin having the same pore size combined with a body or substrate of much larger pores. In other words, symmetrical membranes offer more resistance to fluid flow and therefore have slower flow rates compared to asymmetrical membranes of similar retentivity.

In addition to their retention characteristics, membranes may be characterized by their ability to resist plugging or their dirt-holding capacity. Plugging refers to a reduction of the filtration rate during the filtering operation as a function of the amount of liquid passing the membrane. In order to extend the lifetime of a membrane in a given filtration operation, it is customary to prefilter the fluid through a membrane or filter having higher flow rates and smaller retentivities, but still the ability to reduce severe fouling, or blocking, of the final membrane filter.

Structurally, membranes vary greatly and may generally be classified as either reticulated or granular. In the former, there is a three-dimensional open network of interconnecting fibrous strands and open interstitial flow channels. In the granular type structure, however, incompletely coalesced solid particles called granules leave an interconnected network of pores between them. Reticulated membrane structures generally have a higher porosity than granular membrane structures. As used in the present application, the term bulk porosity is used to mean that percentage of membrane volume which is open to flow of solvent. It is generally equal, or very nearly so, to $$(1 - \text{Bulk density}) \times 100,$$

where bulk density of the membrane is the weight per unit volume of membrane divided by the weight per unit volume of the membrane polymer. Porosity is also defined as the ratio of the weight of a given volume of membrane to that of the bulk polymer forming the membrane.)

Polymeric membranes are generally made by preparing a solution of the polymer in a suitable solvent, forming the solution into a thin sheet, a hollow tube or hollow fiber, and then precipitating the polymer under controlled conditions. Precipitation may be carried out by solvent evaporation or by contacting the polymer solution with a nonsolvent.

U.S. Pat. No. 3,615,024 discloses a method of forming porous polymeric membranes which are described as being highly asymmetric. The membranes produced according to that method are only slightly asymmetric, however, and have a permeability to water which is only slightly higher than that of symmetrical membranes of the same retentivity.

Membranes may also be classified as composite, supported or integral. Composite membranes comprise a very thin retentive layer attached to a preformed porous support. In a support membrane, the actual membrane is attached to a strong sheet material of negligible retentivity. Integral type membranes are formed in one and the same operation having layers of the same composition. These layers may have very different properties, depending, in general, on whether the membrane is symmetrical or asymmetric.

The search has continued for improved, highly asymmetric, membranes having improved retention properties and enhanced flow rates as well as for processes for producing these membranes. This invention was made as a result of that search.

OBJECTS AND SUMMARY OF THE INVENTION

Accordingly, it is a general object of the present invention to avoid or substantially alleviate the above discussed problems of the prior art.

A more specific object of the present invention is to provide improved asymmetric membranes which may be used as ultrafilters or microfilters and which have improved flow rates and dirt-holding capacities.

Another object of the present invention is to provide a process for preparing these improved asymmetric membranes.

Still other objects and advantages of the present invention will become apparent from the following summary of the invention and description of its preferred embodiments.

In one aspect, the present invention provides an improved asymmetric membrane. This membrane comprises a skin and a highly porous asymmetric support. The skin contains pores which have an mean pore diameter of from about 0.005 to about 3.0 microns and the asymmetric support comprises a reticulated structure which contains pores which have pore diameters of from about 10 to about 20,000 times as large as the pore diameters of the pores of the skin. The lower part of the 10 to 20,000 asymmetry factor range corresponds to membranes which have larger surface pores whereas the higher part of the 10 to 20,000 range corresponds to membranes which have finer surface pores. The membrane has a porosity greater than about 70%.

In another aspect, the present invention provides a process for preparing the improved asymmetric membranes described above. This process comprises casting a polymer dope while that dope is in an unstable liquid dispersion condition. The concentration of polymer in the polymer dope should be high enough to produce a coherent membrane yet low enough to form a substantially all-reticulated structure within the asymmetric support. This process produces the membrane described above.

BRIEF DESCRIPTION OF THE DRAWINGS

FIG. IA is a diagram which shows the effect of variations in temperature in arriving at the unstable region.

FIG. IB is a diagram which shows the effect of variations in solvent/non-solvent concentration in arriving at the unstable region.

FIG. II is a diagram which shows the effect of changes in non-solvent concentration on the flow rate and retention of the membranes of the present invention.

FIG. IIIA is a scanning electron microscope photomicrograph of the top surface (magnification: 100,000×) of a membrane having a molecular weight cut-off of 25,000 produced in accordance with the present invention.

Figure 1A:
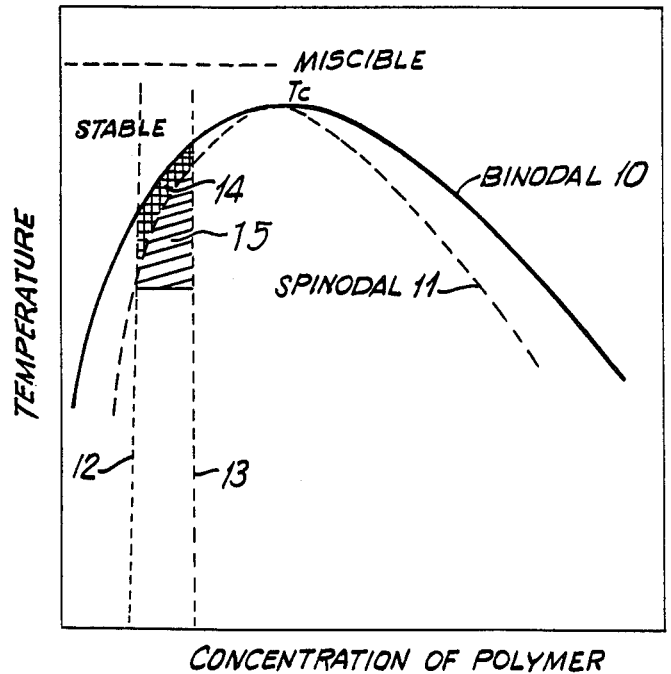
Figure 1B:
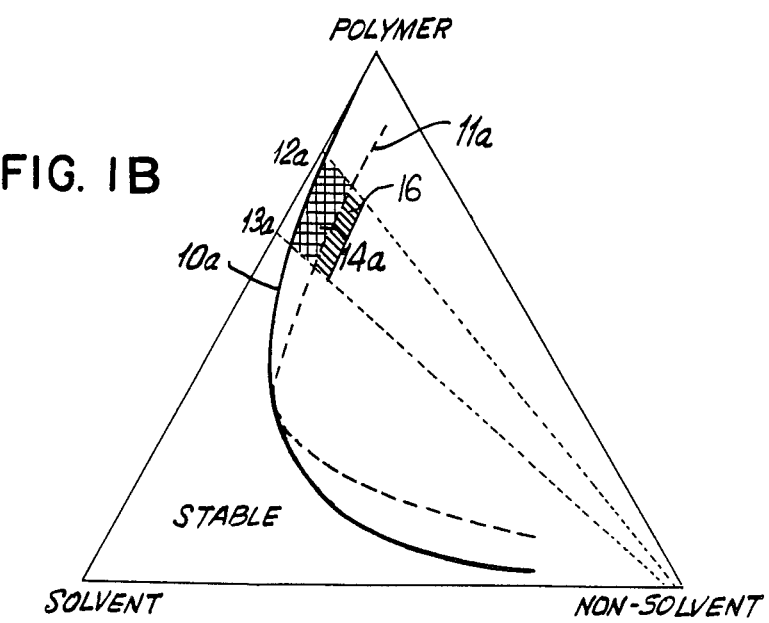
Figure 2:
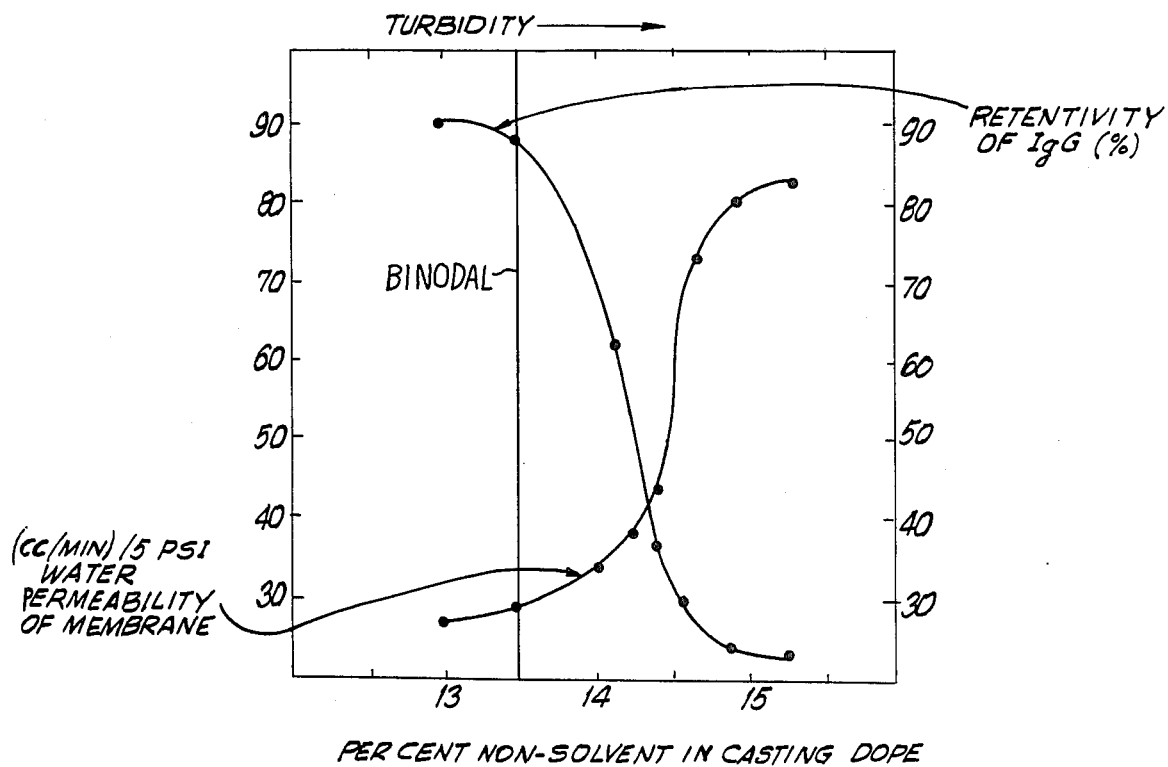
Figure 3A:
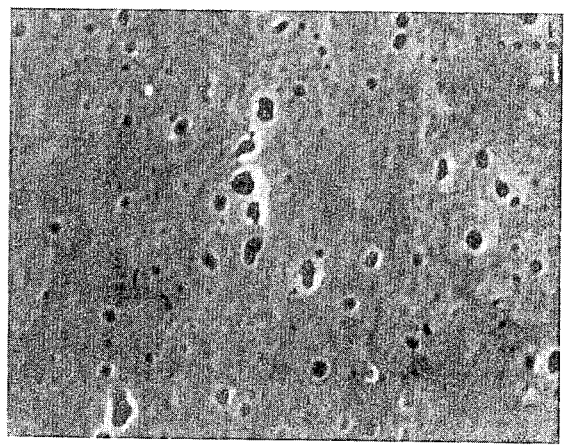
Figure 3B:
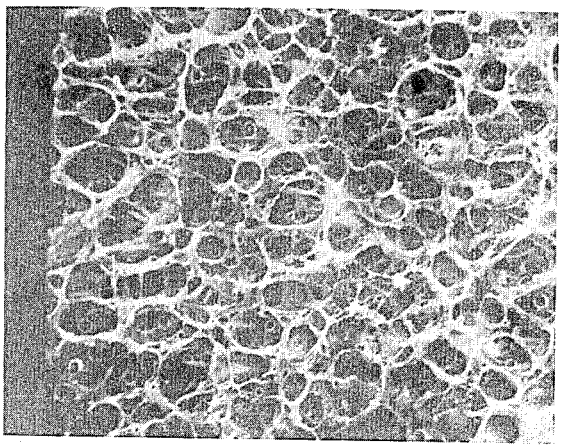
Figure 4A:
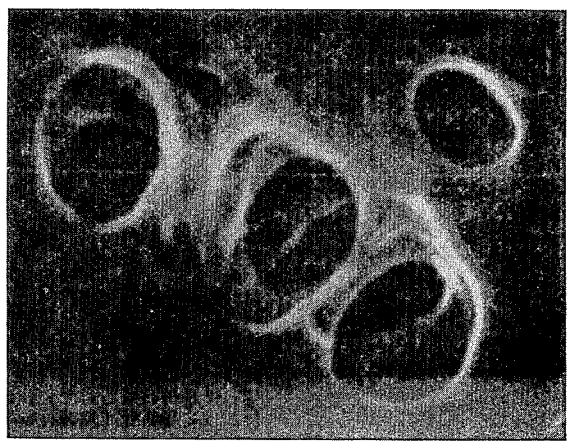
Figure 4B:
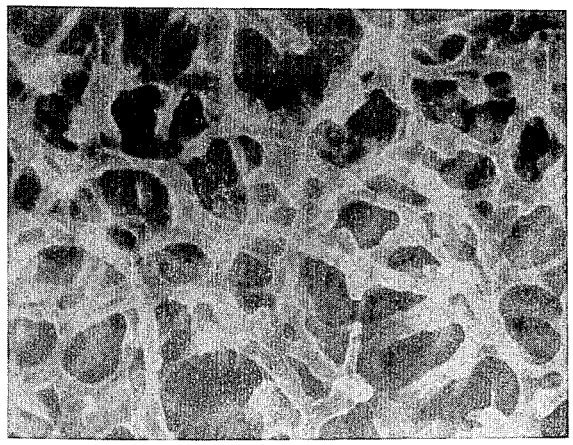
Figure 5:
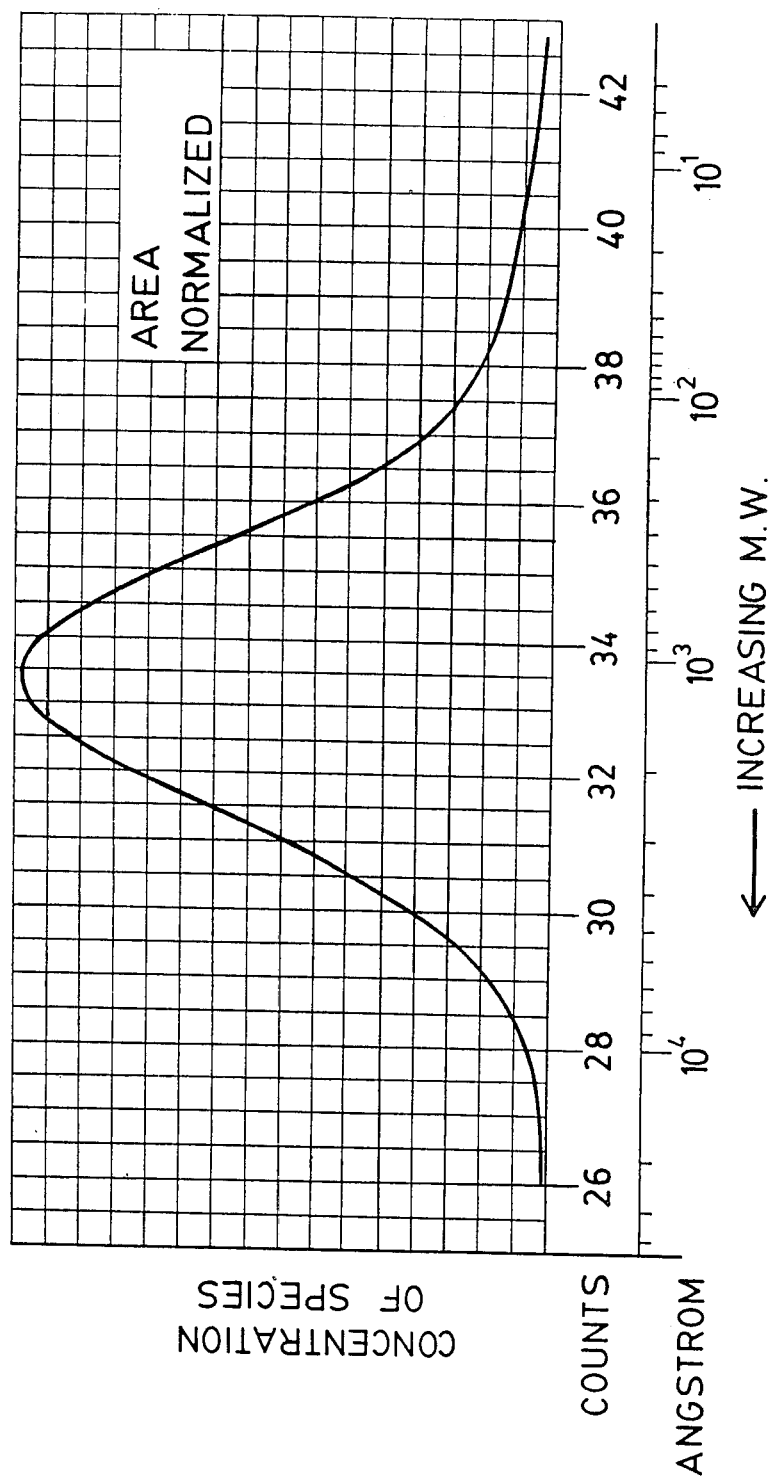

FIG. IIIB is a scanning electron microscope photomicrograph of the bottom surface (magnification: 80×) of the membrane of FIG. 3a having a molecular weight cut-off of 25,000 produced in accordance with the present invention.

FIG. IVA is a scanning electron microscope photomicrograph of the top surface (magnification: 100,000×) of a membrane of the prior art also having a molecular weight cut-off of 25,000.

FIG. IVB is a scanning electron microscope photomicrograph of the bottom surface (magnification: 20,000×) of the membrane of the prior art also having a molecular weight cut-off of 25,000.

FIG. V shows the molecular weight distribution for Union Carbide P-3500 polyarylsulfone.

DESCRIPTION OF THE PREFERRED EMBODIMENT

The present invention comprises, in one aspect, an improved process for preparing asymmetric membranes which have a relatively dense skin and a relatively porous asymmetric support by casting a polymer dope while the dope is in an unstable liquid dispersion and the concentration of the dope is high enough to produce a coherent membrane yet low enough to form a substantially all-reticulated structure within the asymmetric support.

The preparation of membrane casting dopes involves well-known principles of polymer solubility, including the concept of critical miscibility conditions, particularly the critical miscibility temperature, $T_c$. Generally, at temperatures above $T_c$, a polymer is completely miscible with a given solvent, whereas below that temperature, there is a region of phase separation. In the limit of infinite polymer chain length, $T_c$ is the so-called "theta'-'—or $\theta$ temperature or condition, where the interaction forces between polymer molecules and solvent molecules equal the interaction forces of polymer molecules for other molecules of the same polymer.

Solvents for polymers may be categorized as "good" solvents, nonsolvents, and "poor" (or "ideal") solvents. "Good" solvents are those in which the interactions (forces) between the polymer molecules and solvent molecules are greater than the forces of attraction between one polymer molecule and another polymer molecule. The reverse is true for nonsolvents. "Ideal" or "poor" solvents are those in which the interactions between the polymer and solvent are equal to the forces of attraction between one polymer and another polymer molecule.

Good solvents dissolve substantial amounts of polymer and may be miscible with the polymer whereas poor solvents may or may not be miscible depending upon the molecular weight of the polymer and how poor the solvents are.

These definitions apply not only to pure systems but also to mixtures of solvents as well as mixtures of polymers. The correct classification of a solvent requires knowledge of the polymer, temperature, and pressure.

The region on a phase diagram in which polymer is not completely miscible with solvent may be delineated as a function of temperature and solution composition by a curve called the "binodal". On one side of this binodal curve, the system is thermodynamically unstable, and on the other side it is stable. The unstable system close to the binodal is believed to undergo phase separation by a nucleation and growth mechanism. Inside the binodal there exists another region limited by a curve called the spinodal. At or close to the spinodal the mechanism of phase separation may change to the so-called "spinodal decomposition" in which periodic and network structures may form without nucleation.

FIG. I illustrates schematically the binodal and spinodal curves. FIG. Ia shows the effect of temperature and concentration for a polymer and solvent. Line 10 is the binodal and line 11 is the spinodal. The concentration of polymer in the casting dope must be high enough to produce a coherent membrane (see dividing line 12) yet low enough to obtain substantially all-reticulated structure in the asymmetric support (see dividing line 13). The dividing lines 12 and 13 have been established for the purposes of illustration only and do not represent actual polymer concentrations. Polymers of the present invention may be cast in the shaded area 14 of FIG. Ia. Toward the binodal side of region 14, ultrafiltration membranes (pore sizes of from about 0.005 to about 0.025 micrometers) may be produced whereas at the spinodal and to the right of the spinodal line 11, microporous membranes (pore sizes of from about 0.025 to about 3 micrometers) may be produced. The term "unstable liquid dispersion" in this specification refers to the shaded region in FIG. I within binodal 10.

In area 15 of FIG. Ia, membranes may be cast within the "spinodal". The lower temperature limit for this area 15 is the temperature below which there occurs instantaneous bulk separation, i.e., the formation of two macroscopically separated liquid layers. The size of area 15 is not meant to be exact, but for purposes of illustration only.

FIG. Ib is a phase diagram for the three component system polymer-solvent-non-solvent at constant temperature. The numbers in FIG. Ib represent the same thing as the corresponding numbers (absent the "a") in FIG. Ia represent. In area 16 of FIG. Ib, membranes may be cast within the spinodal 11a. The upper limit of nonsolvent for this area 16 is that amount of nonsolvent above which there occurs instantaneous bulk separation, i.e., the formation of two macroscopically separated liquid layers. The size of area 16 is not meant to be exact, but for purposes of illustration only.

In FIG. I, toward the left side of line 10 beside shaded area 14 is the region of stable solutions. These solutions may exhibit some turbidity—as shown by all polymer solutions—and this turbidity or cloudiness may increase gradually as the binodal is approached. If polymer dopes are cast in this region, prior art membranes are produced. These membranes lack the reticulated structure of the asymmetric support of the membranes of the present invention.

The final pore diameter of the membranes of the present invention is directly dependent upon the optical density of the casting dope. Optical density may be determined experimentally using a commercially available turbidity meter such as a Brinkman PC 800 turbidity meter.

At constant optical density, the pore diameter of the resulting membrane is directly dependent upon the temperature. For example, at an optical density of 0.7 (at 420 nanometers with a 2 centimeter optical path and at 100° F.), the pore diameter of a membrane is 0.1 microns when a polysulfone in dimethylformamide with t-butyl alcohol as nonsolvent is used to make the membrane. If the temperature is increased, however, to 110° F., the pore diameter of the membrane would be 0.2 microns. At 140° F., the pore diameter of the membrane would be 0.5 microns. It is, of course, necessary to add increased amounts of non-solvent in order to keep the optical density constant if the temperature is increased.

In order to prepare microporous membranes, the casting dope should generally have an optical density of at least about 0.5, typically from about 0.5 to about 1.0, and preferably from about 0.6 to about 0.8 at 420 nanometers and a 2 centimeter light path. An optimum optical density is 0.7 at 420 nanometers and a 2 centimeter light path because the water permeability of a membrane formed under this condition has a maximum water flux. If polymer dopes are cast at an optical density substantially above about 1.0 at 420 nanometers and a 2 centimeter light path, the resulting membrane would not have sufficient coherence to be of practical value.

In order to prepare ultrafiltration membranes, the casting dope should generally have an optical density of less than about 0.5, typically from about 0.2 to about 0.5, and preferably from about 0.2 to about 0.3 at 420 nanometers. An optimum optical density for preparing ultrafilters is about 0.2 at 420 nanometers and a 2 centimeter light path because, at this particular optical density, membranes are formed which have substantially uniform pore sizes, a particularly advantageous characteristic in an ultrafilter.

When a polymer/solvent system is made to cross the binodal by, for example, lowering the temperature or by, for example, the addition of a non-solvent, phase separation generally occurs spontaneously as evidenced by the appearance of a marked turbidity (i.e., much greater than that of stable solutions), but phase segregation (i.e., the appearance of two distinct bulk layers) is delayed. The system becomes a liquid-liquid dispersion, whose stability depends markedly on how far the system is within the binodal. When the system is within but close to the binodal condition, the system (i.e., polymer dispersion) may appear to be stable for weeks in the sense that no visible segregation takes place. When the system is further inside the binodal, segregation may occur within hours or even minutes. The turbidity of these solutions can be quite high giving them a milky appearance. Since segregated phases are the thermodynamically stable forms of the system, these dispersions are unstable. As the process for converting these unstable dispersions to membranes takes only seconds or minutes, it has been found that such dispersions may be used for the formation of membranes.

Furthermore, it has been found that this unstable liquid dispersed state (within the binodal), which is an essential part of this invention, may be approached from the position of a state comprising stable segregated phases by redispersing (i.e., agitating) those segregated phases. However, the properties of the unstable liquid dispersion and the resulting membranes depend somewhat on how the unstable liquid dispersion has been prepared. For example, when a polysulfone is used to produce the membrane, it has been found that a two phase liquid system is obtained when a solution of the polysulfone with a good solvent such as dimethylformamide is titrated to the desired turbidity with an appropriate amount of non-solvent such as tertiary amyl alcohol. When Union Carbide P-3500 polyarylsulfone, which has a relatively wide and symmetrical molecular weight distribution, is used, the volume ratio of each of these phases (one is polymer rich and the other sulfone were to be added to a mixture of dimethylformamide and teritiary amyl alcohol, a three phase system would be produced. When the same Union Carbide P-3500 polyarylsulfone is employed, the three phases have a volume ratio of approximately 50 (polymer rich):45 (polymer poor):5 (substantially all polymer).

Although I do not wish to be bound by any particular theory underlying this invention, it is presently believed that the unique feature involved in the method by which these membranes are made lies in casting from an unstable liquid dispersion rather than the usual polymer solution. The formation of this unstable liquid dispersion depends not only upon the composition of polymer, solvent, and nonsolvent from which it is formed, but also upon the way in which these components are combined as noted above. Preferably the polymer is dissolved in a mixture of solvent and nonsolvent which contains slightly less nonsolvent than required for the particular pore diameter membrane to be produced. The additional nonsolvent is added in a controlled manner until an optical density corresponding to the desired particle size is attained.

In general, as the system proceeds from the binodal to and beyond the spinodal, the turbidity of the dispersion increases. This is in part due to the presence of more of the separating phase but is also believed due, in part, to the formation of larger dispersed liquid particles. Ultrafilters are produced when the polymer dope is cast within the shaded area 14 of FIG. Ia but near the binodal. When the polymer dope has a concentration corresponding either to the line 11 which borders this shaded area 14 or to the right of line 11, two segregated phases are readily formed. When the polymer dispersion having such a composition is cast, microporous membranes are obtained.

During quenching of the unstable dispersed polymer solution with a suitable non-solvent, very rapid soldification occurs. While this process of solidification is not yet fully understood, it is believed that for the membranes of this invention, the mechanism of soldification involves spinodal decomposition of the very unstable system formed by the interaction of the coagulating liquid with the casting dope. Because of the rapidity of the process, the process may be carried out even with the relatively low viscosity polymer dopes. It is also believed that spinodal decomposition is favored by bringing the casting dope to its spinodal.

The critical importance of casting membranes from solutions within the binodal and even within the spinodal is demonstrated in the way the properties of resulting membranes are affected as illustrated in FIG. II. FIG. II shows the water permeability and retention of the protein Immunoglobulin G of membranes produced from a dope containing 10 percent polysulfone in dimethylformamide with various amounts of the non-solvent methyl-1 butanol. It may be seen that an enormous change in water permeability and solute retentivity occurs between about 14.4 and 14.6 percent of added non-solvent. The binodal corresponds to about 13.5 percent and it is after the binodal is crossed by increasing the percentage of non-solvent that the water permeability of the resulting membrane is optimized. The individual points in FIG. II show how reproducibly the properties of the membranes may be controlled.

In addition to the requirement of an unstable polymer-solvent non-solvent casting dope, the relationship of these components to the quench liquid is also important. The polymer must, of course, be insoluble in the quench liquid and the solvent should be soluble in the quench liquid (and vice versa). In fact, it is also preferred that the solvent and quench liquid be completely miscible with each other under membrane formation conditions. Water is a generally preferred quench liquid for economic and environmental reasons. It is also preferred that the solvent have a low viscosity.

If the solvent has a low viscosity and the solvent and quench liquid are completely soluble in one another, rapid diffusion of the quench liquid into the casting dope is assured.

The non-solvent, if present, should preferably have only limited solubility in the quench liquid. In making ultrafilters, it is preferred that the non-solvent be substantially completely non-miscible with the quench liquid. This limited solubility is believed to be effective in increasing the asymmetry of the resulting membrane.

The asymmetry of a porous membrane may be measured by the ratio of the mean pore diameter of its two faces. As noted hereinabove, the asymmetry factor for the membrane of this invention is from about 10 to about 20,000. For microporous membranes, the asymmetry factor is generally from about 10 to about 300, typically from about 50 to about 150, and preferably from about 75 to about 125.

The formation of membranes having larger pores (above about 0.2 microns) may be accomplished in various ways as discussed herein but, for convenience, the process by which these large pore membranes are produced is preferably facilitated by increasing the proportion of non-solvent in the casting dope. At constant turbidity, the amount of non-solvent that may be added to the system without causing prompt segregation of phases is higher at higher temperatures. For best results it is preferred to increase the temperature very close to the critical temperature for a given solvent/non-solvent combination as illustrated in FIG. Ia and also as in Example VIII. At lower temperatures, such proportions of solvent described are not attainable.

The overall properties of the membranes may be varied by varying parameters such as polymer concentration, non-solvent nature and concentration, temperature and other properties such as turbidity. Thus, routine experimentation may be required to optimize properties for each particular system.

The quench liquid as indicated above should be inert with respect to the polymer used and should preferably be miscible with the polymer solvent and should preferably have limited miscibility with the non-solvent. When water is used as the quench liquid, its properties and those of the resulting membranes may be modified by the presence of certain additives, such as surfactants and solvents. The addition of one or more surfactants to the quench liquid often makes an otherwise hydrophobic membrane hydrophilic so that it is easily wetted by water and thus may be used for filtration without substantial pressure to overcome capillary forces.

The amount of surfactant may vary widely but generally from about 0.001 to about 2 percent, typically from about 0.02 to about 0.2 percent, and preferably from about 0.02 to about 0.1 percent by weight of total quench liquid may be employed.

Typical surfactants include sodium dodecyl sulfate, ethoxylated alcohols, glycerol esters and fluorocarbon surfactants.

The concentration of the polymer in the casting dope must be low enough to form a substantially all-reticulated structure within the asymmetric support but must be high enough to produce a coherent membrane. If the polymer concentration were too low, the resulting membrane would have no coherency and, in the extreme case, only dust would be formed. If the polymer concentration were too high, then the structure within the asymmetric support would not be all substantially reticulated, but would contain at least some granulated structure.

Although the appropriate concentration of polymer varies somewhat depending upon the particular polymer used, the polymer concentration when the polymer is polysulfone, polystyrene, or polyamide alone should be generally from about 6 to about 13, typically from about 8 to about 12, and preferably from about 9 to about 11 percent by weight of the casting dope. The particular polymer chosen will, of course, determine to a large extent the final properties of the membrane.

It will be evident from the above that this invention may be practiced with a variety of polymers or their mixtures, solvents or their mixtures, and non-solvents or their mixtures and over a range of temperatures, provided that the combination of these components and parameters is such as to produce the desired instability of liquid phases. The properties and performance of the membrane produced by casting an unstable dope depend not only on the degree of this instability and on the general relationship of mutual solubility of the polymer, solvent, non-solvent and quench liquid as outlined above, but also on the particular materials selected and their mutual interactions as well as the temperature in a manner that is not fully understood at present. The following are some of the materials which have been found useful in the practice of this invention but it will be clear to those skilled in the art that many others and/or their combinations may also be used.

The polymers which may be used to produce these membranes include broadly any polymer generally used to produce membranes and capable of producing two coexisting liquid phases, although, as will be discussed in greater detail hereinbelow, the choice of polymer is related to the choice of solvent, non-solvent, and temperature used in the casting process. Polymers which have been found to be particularly useful in the instant process include polysulfones, polyamides, polyvinylidene halides including polyvinylidene fluoride, polycarbonates, polyacrylonitriles including polyalkylacrylonitriles, polystyrene. Mixtures of two or more polymers may also be used.

Preferred polymers within the above-noted groups for use in the present invention include Lexan polycarbonate, Union Carbide P-3500 polyarylsulfone, Nylon 6/T polyhexamethylene terepthalamide, and polyvinylidine flouride.

A particularly preferred polymer for use in the presently claimed invention is Union Carbide P-3500 polyarylsulfone. When this particular polymer is employed, it has been found that a average molecular weight of 30,000 is needed in order to obtain a coherent membrane with a reticulated structure. The upper limit of molecular weight approximately one million. The use of polyarylsulfone with molecular weight in excess of one million is undesirable because of the formation of polymer gels due to chain entanglement. The molecular weight range of the other polymers that may be useful in the presently claimed invention differs, of course, depending upon the particular polymer employed.

As noted hereinabove, the casting dopes useful in the present invention are in an unstable liquid dispersion condition. This means that, with sufficient time, the liquid dispersion will segregate into two or more segregated liquid phases. In order to obtain a more coherent membrane, it is preferred that each segregated phase be a substantial amount, generally from about 25 to about 75, typically from about 35 to about 65, preferably from about 45 to about 55 volume percent, of the casting dope. Accordingly, it is preferred that the polymer used in making these membranes have a relatively wide and substantially symmetrical molecular weight distribution, such as that shown in FIG. V for Union Carbide P-3500 polyarylsulfone. If a polymer having a comparatively narrow molecular weight distribution were to be used, the concentration of polymer in one of the phases becomes high and gelation may take place.

The solvents which may be used to produce membranes according to this invention include:

Dimethylformamide
Dimethylacetamide
Dioxane
N-Methyl pyrrolidone
Dimethylsulfoxide
Chloroform
Tetramethylurea
Tetrachloroethane Suitable non-solvents include:

Methanol
Ethanol
Isopropanol
Amyl alcohol
Hexanol
Heptanol
Octanol
Propane
Hexane
Heptane
Octane
Acetone
Methylethylketone
Methylisobutyl ketone
Nitropropane
Butyl ether
Ethyl acetate
Amyl acetate A significant advantage of the membranes of the present invention is their high fluid permeability, particularly for small pore sizes. This is believed to be the result of their very high asymmetry so that the reticulated part of the membrane offers a relatively low resistance to fluid flow as compared to the finely porous skin. At higher pore sizes the advantage of membranes prepared according to this invention is less striking but remains significant even at the large 0.4 micron pore size (Example IX). These membranes can provide a flow rate of over 8 cm/min psi which is 30 to 60% greater than that of membranes now commercially available.

A log-log plot of the water permeability of the membranes of the present invention against pore size indicates a less than inverse relationship whereas the same plot of conventional membranes indicates a much faster decrease.

The membranes of this invention may be used with either the skin side or the support side of the membrane upstream with respect to fluid flow. For microporous membranes, however, it is preferred to use the membrane so that the support is upstream. In this way, the reticulated porous support serves as a built-in prefilter, greatly increasing the dirt-holding capacity of the membrane. The fluid encounters the largest pores first and later encounters pores having gradually decreasing size with the smallest pores—those in the skin—being encountered last. Hence larger particles are retained before they reach the skin and do not clog its pores. An in-depth filtration is obtained in which the particles are retained at various levels leaving many more pores available for flow than if they were all retained in one plane at the skin. If the membrane is not highly asymmetrical this advantage does not exist since approximately the same amount of retained matter fouls both sides of the membrane because the pore sizes on both sides are approximately the same.

When a microporous membrane of the present invention is used with its support side upstream, it has been found that the volume of fluid which may be passed through the membrane by the time the rate of flow through the membrane is reduced to 50% of the initial value is generally at least about 2, typically from about 2 to about 6, and preferably at least about 5 times as large as the volume of fluid which may be passed through the same membrane used with its skin side upstream.

For certain applications, it is important that one be able to readily test the integrity of a membrane. The so-called "bubble point" test may be used to determine the largest pore size in the membrane. This bubble point test involves passing a gas such as air, through a wetted membrane and determining the pore size as a function of the pressure needed to push a bubble through that pore of the membrane. If the highly asymmetric microporous membranes of this invention are used with the support side upstream, the representative bubble point of the skin may be difficult to obtain because the gas may pass parallel to the skin out the sides of the asymmetric support. It is important that the pores along the periphery of the membrane be closed to prevent this. The use of hard, narrow gaskets with sufficient pressure upon the gaskets can give satisfactory results.

One may also eliminate the pores from the outer perimeter of the asymmetric support by either removing those pores or filling the pores by means of, for example, sealing the outer diameter of the membrane, such as by heat sealing, filling the pores with an impermeable substance, such as glue, or mechanically collapsing the pores. By filling these pores or removing these pores, the representative bubble point of the skin may be obtained.

The present invention is further illustrated by the following examples. All parts and percentages in the examples as well as in the specification and claims are by weight unless otherwise specified.

EXAMPLE I

A 5% by weight solution of polymethacrylonitrile in dimethylformamide is prepared at 40° C. with rapid stirring. The solution is degassed by placing it in a water bath at 40° C. for 30 minutes and then cooled to 30° C. (the critical temperature). At this temperature the solution becomes abruptly turbid. This solution is spread by means of a casting knife to a wet thickness of 10 mils onto a glass plate which is preheated to 30° C. and the plate is transferred immediately into a water bath at ambient temperature, causing the wet film to coagulate. The resulting membrane has a water flow rate of 0.5 cm/min psi and a mean skin pore diameter of 0.5 microns.

When polymethacrylonitrile is used as the polymer, the amount of polymer used should be generally at least about 3, typically from about 3 to about 7, and preferably from about 4 to about 6% by weight based upon the total weight of the casting dope.

EXAMPLE II

A mixture of 73.4 parts by weight dimethylformamide and 15.6 parts by weight tertiary amyl alcohol is formed. To this mixture is slowly added 11 parts of granulated Union Carbide P-3500 polyarylsulfone which has been previously air dried and stored in a vacuum until used. After addition of the polysulfone, the mixture is vigorously stirred for a minimum of eight hours in the absence of moisture.

This mixture is then placed in a dispensing tank at 112° F. by agitating in a partial vacuum sufficiently to eliminate air bubbles but not so great as to cause nonsolvent loss. The turbidity is then adjusted by adding either solvent or nonsolvent as required to obtain an optical density of 0.70±0.03 at 420 nanometers with a 2 centimeter light path to form a casting dope.

This casting dope is transferred into a casting knife (which is heated to a temperature of 112° F.) through a 3 micron rated polypropylene filter. The dope is cast onto a siliconized paper and quenched in a water bath which is preheated to 100° F. and contains surfactant.

The membrane is rinsed in deionized water and dried at 250° F. It has a mean pore diameter of 0.1 micrometers, a bubble point in water, using nitrogen gas, of 60 psi, and a water permeability of 3 cm/min-psi.

EXAMPLE III

A mixture of 10 parts by weight polystyrene, 15 parts by weight isopropyl alcohol, and 75 parts by weight dimethylformamide is thoroughly mixed to form an unstable liquid dispersion. The dispersion is allowed to set until phase segregation takes place. Two phases are formed in a volume ratio of 70 to 30.

The phase segregated liquids are then microdispersed in a Waring blender at 15,000 revolutions per minute. After degassing (See Example II), a membrane is prepared by casting the microdispersed polymer dope into a water quench bath.

The bubble point of the wet membrane is 31 psi and the membrane has a water permeability of 5 cm/min-psi.

This Example illustrates the fact that the two phase segregated liquids may be microdispersed although a relatively large amount of energy is needed to effect the mixing.

EXAMPLE IV

To a mixture of 43.6 parts by weight of dimethylformamide and 47.9 parts by weight of isopropyl alcohol is added 8.5 parts by weight of Nylon 6/T polyhexamethylene terephthalamide. The resulting colloidal solution has a turbidity of 0.2 optical density at 420 nanometers. This dispersion is cast at room temperature by means of a doctor blade having a knife gap of 300 micrometers into water to form a strong, coherent, opaque, microporous membrane with a thickness of 87 micrometers.

This membrane has a water flow rate of 7.2 cm/min-psi and retains 99.8% of Dow latex calibration particles with a mean skin pore diameter of 0.22 microns.

EXAMPLE V

A solution of polysulfone (P-3500 Union Carbide) is prepared in dimethylformamide and titrated with isopropyl alcohol to a composition consisting of 9.5% polysulfone, 10.3% isopropyl alcohol and 80.2% dimethylformamide. This solution is cast at ambient temperature into a membrane as described in Example I. This membrane has a flow rate of 4 cm/min-psi and a mean skin pore diameter of 0.2 microns, an elongation at break of 24% and a tensile strength of 30 kg/cm².

EXAMPLE VI

A mixture of 8 parts by weight polyvinylidene fluoride, 9.3 parts by weight glycerin, and 82.7 parts by weight dimethylformamide is stirred at ambient temperature for two hours. After degassing, the mixture has a turbidity of 0.8 optical density at 420 nanometers and is cast into water forming a membrane which has a mean pore size of 0.4 microns and a deionized water flow rate of 9 cm/min-psi.

When polyvinylidene fluoride is used as the polymer, the amount of polymer should be generally from about 5 to about 11, typically from about 6 to about 10, and preferably from about 7 to about 9% by weight of the casting dope.

EXAMPLE VII

To 90 parts of a mixture of 60 parts by weight of dimethylformamide and 40 parts by weight of isopropyl alcohol, there is added 10 parts by weight of Nylon 6/T polyhexamethylene terephalamide. The resulting turbid solution is cast as shown in Example IV to produce a membrane having a flow rate of 1.2 cm/min-psi and a rejection of Bovine serum albumin at a level of 94%.

EXAMPLE VIII

A solution of polysulfone (P-3500 Union Carbide) is prepared in dimethylformamide and titrated with hexane to a composition consisting of 9.9% polysulfone, 11.9% hexane, and 78.2% dimethylformamide. This solution is cast into water at ambient temperature resulting in a membrane with a flow rate of 0.32 cm/min-psi and 98% retention of ovalbumine.

EXAMPLE IX

A solution of polysulfone (P-3500 Union Carbide) is prepared in dimethylformamide and heated at 40° C. This solution is then titrated with 2-methyl-2-butanol to an absorbance reading of 0.600 corresponding to a concentration of 9.5% polysulfone, 15.5% 2-methyl-2-butanol and 75% dimethylformamide. (The absorbance is zeroed with a 12% polysulfone/88% dimethylformamide solution.) This solution is cast at 40° C. into water. The resulting filter has a flow rate 7.4 cm/min-psi, a bubble point of 35 psi and an average pore diameter of 0.4 microns.

COMPARATIVE EXAMPLE

FIG. III is a scanning electron microscope photomicrograph of the top surface (magnified 100,000 times) and the bottom surface (magnified 80 times) of a membrane (having a molecular weight cut-off of 25,000) produced in accordance with the present invention by casting a solution of 10% polysulfone in a 78/12 mixture of dimethylformamide/hexane. The pore diameter of the asymmetric support at the dull side is approximately 20,000 times the diameter of the pores in the shiny skin (i.e., the membrane has a pore asymmetry of 1:20,000). The water permeability of the membrane is 0.30 cm/min-psi.

FIG. IV is a scanning electron microscope photomicrograph of a prior art Millipore ultrafilter PSED, also having a molecular weight cut-off of 25,000. This top surface is magnified 100,000 times and the bottom surface is magnified 20,000 times. The pore asymmetry is 1:1. Its water permeability is 0.01 cm/min-psi.

A comparison of FIGS. III and IV illustrates the highly asymmetric character of membranes produced according to the presently claimed invention vis-a-vis prior art membranes.

The membranes of the present invention are integral membranes having a skin which comprises generally less than about 5, typically from about 1 to about 5, and preferably from about 1 to about 3% of the thickness of the membrane. The remaining part of the membrane is the asymmetric support. There is a relatively sharp boundary between the skin layer and the asymmetric support layer although both layers form an integral membrane. There is a gradual change in pore size from the skin of the membrane to the opposite face of the membrane. The gradient in pore size in the asymmetric support is substantially logarithmic with respect to thickness, increasing gradually from the barrier skin.

The water permeability, p, of the membranes of the present invention is substantially linearly related to its retentive pore size, r, by the equation $p = Kr$ where K is the constant and for the membranes of the present invention K is generally greater than $3 \times 10^5$/min-psi. For ultrafilters, K is generally greater than about $12 \times 10^5$/min-psi, and preferably greater than about $25 \times 10^5$/min-psi. When the membrane is of a sterilizing grade, i.e., the pore radius is greater than 0.5 microns, K is preferably larger than $6 \times 10^5$/min-psi.

The pore diameter distribution (i.e., the ratio of the maximum pore size to the mean pore diameter) within the skin of the membranes of the present invention is generally less than about 5, typically less than about 3, and preferably less than about 2.

The membranes of the present invention have improved physical properties over prior art membranes. For example, a 0.2 micron polysulfone membrane produced according to the process of the present invention has a tensile strength of 30 kg/cm$^2$, an elongation at break of 24% (see Example V) in comparison to an elongation of about 5% with respect to 0.2 micron prior art membranes. These improved physical properties are important in most membrane applications but are of particular importance in medical applications where any membrane rupture due to insufficient elongation could be critical.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

I claim:

1. A method of making a highly asymmetric integrally skinned polymer membrane with excellent retention properties, a high flow rate, and improved resistance to fouling, said method comprising:
   A. mixing a polymer and a solvent to produce a polymer solution,
   B. adding a non-solvent in an amount sufficient to produce an unstable dispersion within the binodal or spinodal,
   C. casting said dispersion on a support,
   D. quenching said dispersion with a non-solvent quenching liquid in which the solvent is freely soluble but in which the polymer is substantially insoluble, and
   E. recovering a membrane having a bulk porosity greater than 70%, an integral skin with an mean pore diameter of from about 0.003 to about 3.0 microns and a reticulated integral porous support layer with a gradually increasing mean pore diameter from the skin face to the opposite face, so that at the opposite face the pores have an mean diameter of from at least about 10 to about 20,000 times the average pore diameter of the pores of the skin.

2. The method of claim 1 wherein the properties of the dispersion prior to casting are controlled as a function of the optical density of the dispersion.

3. The method of claim 2 wherein the mean skin pore diameter is a function of optical density at the quenching step.

4. The method of claim 2 wherein said optical density is maintained in the range of from about 0.2 to 0.5 at 420 nanometers.

5. The method of claim 2 wherein said optical density is maintained in the range of from about 0.2 to 0.3 at 420 nanometers.

6. The method of claim 1 wherein the properties of the dispersion prior to casting are controlled as a function of the temperature of the dispersion.

7. The method of claim 6 wherein the mean skin pore diameter is a function of temperature of the dispersion at the quenching step.

8. The method of claim 1 where the optical density and temperature of the dispersion prior to casting are controlled, with the adjustment of the proportion of non-solvent to the polymer dope necessary to maintain the dispersion within the spinodal or binodal, in order to control the mean skin pore diameter of the resulting membrane.

9. The method of claim 1, wherein said polymer is selected from the group comprising polyamides, polyvinylidene halides, polysulfones, polyacrilonitriles and mixtures thereof.

10. The method of claim 1, wherein the solvent is selected from the group comprising dimethyformamide, dimethylacetamide, dioxane, n-methyl pyrrolidone, dimethylsulfoxide, chloroform, tetramethylurea, and tetrachloroethane.

11. The method of claim 1, wherein the non-solvent is selected from the group comprising methanol, ethanol, isopropanol, amyl alcohol, hexanol, heptanol, octanol, propane, hexane, heptane, octane, acetone, methylethylketone, methylisobutyl ketone, nitropropane, butyl ether, ethyl acetate, and amyl acetate.

* * * * *